United States Patent
Kawaguchi et al.

(10) Patent No.: US 7,776,245 B2
(45) Date of Patent: Aug. 17, 2010

(54) METHOD OF FEEDING MOLTEN RESIN AND APPARATUS FOR FEEDING MOLTEN RESIN

(75) Inventors: Kiyoshi Kawaguchi, Yokohama (JP); Masayuki Sasaki, Yokohama (JP); Jun Yonesato, Yokohama (JP); Hiroyuki Hashimoto, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 0 days.

(21) Appl. No.: 12/281,037

(22) PCT Filed: Feb. 20, 2007

(86) PCT No.: PCT/JP2007/053460

§ 371 (c)(1),
(2), (4) Date: Aug. 28, 2008

(87) PCT Pub. No.: WO2007/105464

PCT Pub. Date: Sep. 20, 2007

(65) Prior Publication Data

US 2009/0236767 A1 Sep. 24, 2009

(30) Foreign Application Priority Data

Feb. 28, 2006 (JP) .............................. 2006-051659

(51) Int. Cl.
*B29C 47/88* (2006.01)
(52) U.S. Cl. .................. 264/148; 264/211.12
(58) Field of Classification Search ........................ None
See application file for complete search history.

(56) References Cited

U.S. PATENT DOCUMENTS 4,943,405 A 7/1990 Keller et al.
6,716,386 B2 * 4/2004 Saito et al. .................. 264/532
6,929,836 B2 * 8/2005 Kikuchi et al. ............. 428/35.7
2002/0088767 A1 * 7/2002 Saito et al. .................... 215/40

FOREIGN PATENT DOCUMENTS

| DE | 28 36 941 A1 | 3/1980 |
| EP | 0 328 096 A1 | 8/1989 |
| JP | 5-293799 A | 11/1993 |
| JP | 6-198665 A | 7/1994 |
| JP | 2004-276372 A | 10/2004 |
| JP | 2004-314336 A | 11/2004 |
| JP | 3674337 B2 | 5/2005 |
| WO | 2004/067251 A1 | 8/2004 |
| WO | 2005/102642 A1 | 11/2005 |

OTHER PUBLICATIONS

Database WPI Week 200481; Thomson Scientific, London, GB; AN 2004-816137; XP002573295.

* cited by examiner

*Primary Examiner*—Monica A Huson
(74) *Attorney, Agent, or Firm*—Sughrue Mion, PLLC (57) ABSTRACT

An apparatus for feeding a molten resin is operated for extended periods of time maintaining stability without permitting volatile components of the molten resin to adhere on the surfaces of conveyer means. An extruder in the apparatus for feeding the molten resin to the compression-forming machine has an extrusion unit which discharges a molten resin through an extrusion opening of an extrusion nozzle. An air injection nozzle for injecting the cooling gas is provided along the outer circumference of the extrusion nozzle, and the cooling gas is blown onto the surface of the molten resin extruded from the extrusion opening to cool the surface of the molten resin.

4 Claims, 6 Drawing Sheets

METHOD OF FEEDING MOLTEN RESIN AND APPARATUS FOR FEEDING MOLTEN RESIN

TECHNICAL FIELD

The present invention relates to a method of feeding a molten resin which cuts the molten resin extruded from an extrusion opening of an extrusion nozzle by cutting means, holds the molten resin after cut by using holding means, and feeds the molten resin to a forming machine, and to an apparatus for feeding the molten resin.

BACKGROUND ART

Containers made of synthetic resin such as polyester have been widely put into practical use for containing beverages. Preforms from which synthetic resin containers are obtained by blow forming have, in recent years, been integrally formed by compression forming by using a compression-forming machine.

In executing the compression forming, the synthetic resin in a molten state as extruded from an extrusion opening of an extrusion nozzle is fed (conveyed) into the compression-forming machine in a manner as described below.

The molten resin is heated and melted in an extruder, and is extruded from the extrusion opening of the extrusion nozzle of the extruder. The molten resin that is extruded is cut by cutting means, and is separated away from the extrusion opening. The molten resin (molten resin to be cut) that is cut is fed onto molten resin conveyer means arranged in a transfer mechanism.

The conveyer means is selectively set to a closed state where it holds the molten resin and to an opened state where it discharges the molten resin that is held to the down side, and further moves about the rotary shaft thereof. The molten resin received by the holding means which is in the closed state moves to a position over a female mold of the compression-forming machine. Thereafter, when the holding means is placed in the opened state, the molten resin is discharged (falls) downward so as to be transferred into the female mold.

The molten resin transferred into the female mold is compression-formed by the cooperation with a male mold of the compression-forming machine, and is formed into a polyester preform of any desired shape for forming a beverage bottle or is formed into various products.

Japanese Patent No. 3674337 proposes an apparatus for cutting the extruded molten resin into a predetermined amount and for feeding it to a metal mold for compression forming. Here, when a polyester resin is treated, a trace amount of volatile components volatilizes from the surface of the extruded molten resin. After operated for extended periods of time, the volatile components adhere on the surfaces of a cutting tool, conveyer means and metal molds; i.e., the components adhered on the surfaces build up thereon permitting resin components of low molecular weights to further deposit thereon. If the resin components deposit, the molten resin easily sticks onto the conveyer means, and the timing for feeding the molten resin to the metal mold varies. With the conventional apparatus for feeding the molten resin, therefore, the molten resin could not be fed to the metal mold maintaining stability for extended periods of time, and the tools and the metal molds had to be cleaned at regular intervals for carrying out the continuous production.

The present invention was accomplished in view of the above circumstances and has an object of providing a method of feeding a molten resin, which can be operated for extended periods of time maintaining stability without permitting the volatile components to deposit on the surfaces of the conveyer means, and an apparatus for feeding the molten resin.

DISCLOSURE OF THE INVENTION

The present invention was accomplished by giving attention to the following fact. That is, the apparatus for feeding a molten resin was cleaned with a solvent and, thereafter, the molten resin was consecutively fed and interrupted to analyze the total amount of deposit on the portions that held the molten resin. In this case, the amount of the oligomer component was 0.1 to 0.15 µg and the amount of the high molecular PET component was about 0.15 µg per the cut and conveyance of the molten resin of each time. On the other hand, when the air was blown with a pressure of 0.1 MPa onto the molten resin, the amount of the oligomer component decreased down to 0.04 to 0.05 µg and the amount of the high molecular PET component decreased down to 0.003 µg per the cut and conveyance of the molten resin of each time.

In order to achieve the above object, the present invention provides a method of feeding a molten resin by extruding the molten resin from an extrusion opening of an extrusion nozzle, cutting the molten resin with a cutting tool after having injected, or while injecting, a cooling fluid onto the surface portion of the molten resin maintaining a predetermined gap from the extrusion opening in a direction in which the molten resin is extruded, holding the molten resin after cut so as to be conveyed up to a female mold of a compression-forming metal mold, and causing the molten resin at a position just over the female mold to fall down into the female mold.

In order to achieve the above object, further, an apparatus for feeding a molten resin of the present invention comprises an extrusion nozzle for discharging the molten resin from an extrusion opening; a cutting tool for cutting the molten resin discharged from the extrusion opening of the extrusion nozzle; a holding member equipped with a mechanism for holding and releasing the molten resin discharged from the extrusion opening; and conveyer means for supporting the cutting tool and the holding member, and for conveying the holding member holding the molten resin after having been cut up to a female mold of a compression-forming metal mold; wherein the holding member releases the molten resin at a position over the female mold so as to be fed into the female mold; the apparatus for feeding a molten resin further comprising injection means for injecting the fluid to the surrounding of the extrusion nozzle, wherein an injection port of the injection means is directed to the surface of the molten resin maintaining a predetermined gap from the extrusion opening of the extrusion nozzle in a direction of extrusion of the extrusion nozzle, and the molten resin of which the surface is cooled with the fluid is held by the holding member.

In the above apparatus for feeding a molten resin, the injection means is provided in an annular shape to surround the extrusion nozzle, and a gap for insulating the heat is formed in an annular shape between the fluid feeding means and the extrusion nozzle.

Further, the above apparatus for feeding a molten resin becomes more effective if the molten resin is a molten resin of polyester.

BEST MODE FOR CARRYING OUT THE INVENTION

The apparatus for feeding a molten resin according to an embodiment of the invention will now be described with reference to the drawings.

Figure 1:
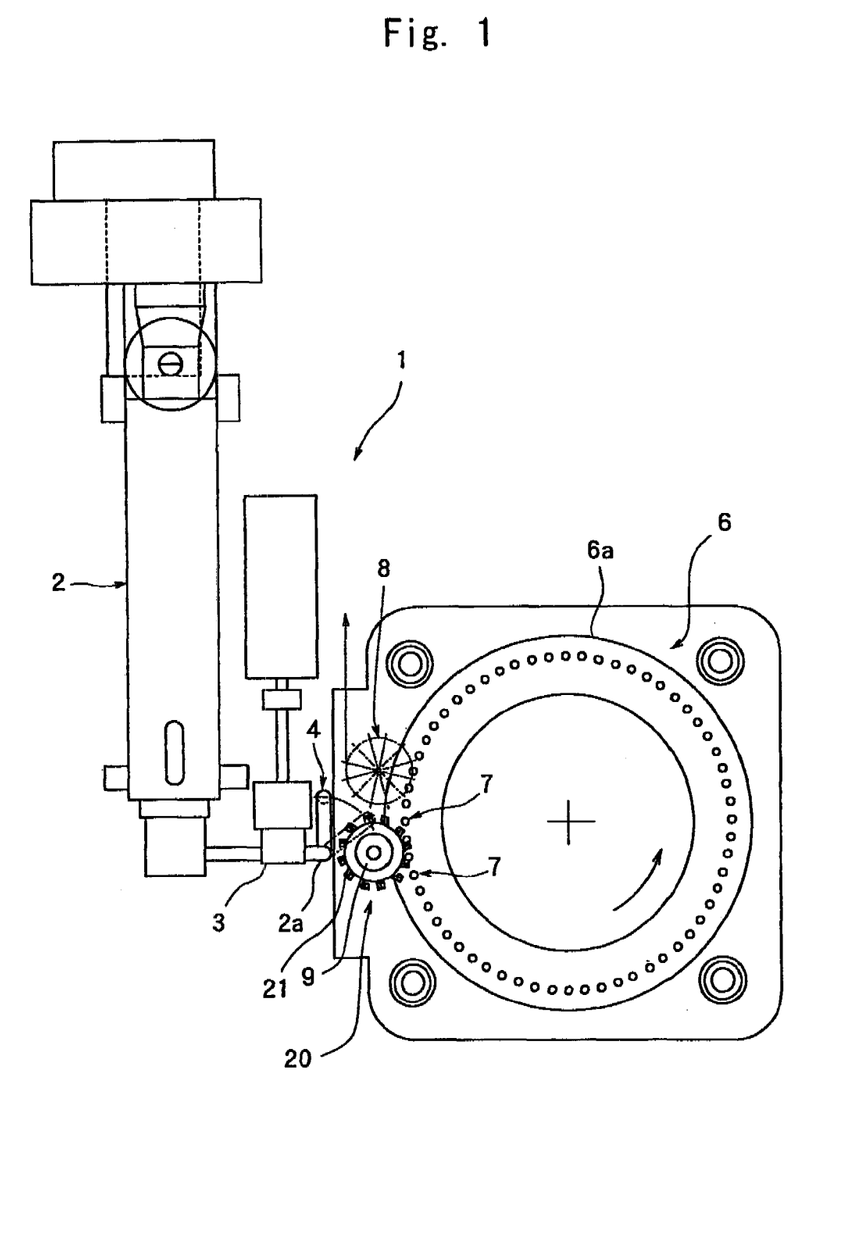
FIG. 1 is a plan view schematically illustrating an apparatus for feeding a molten resin according to an embodiment of the present invention.
Figure 2:
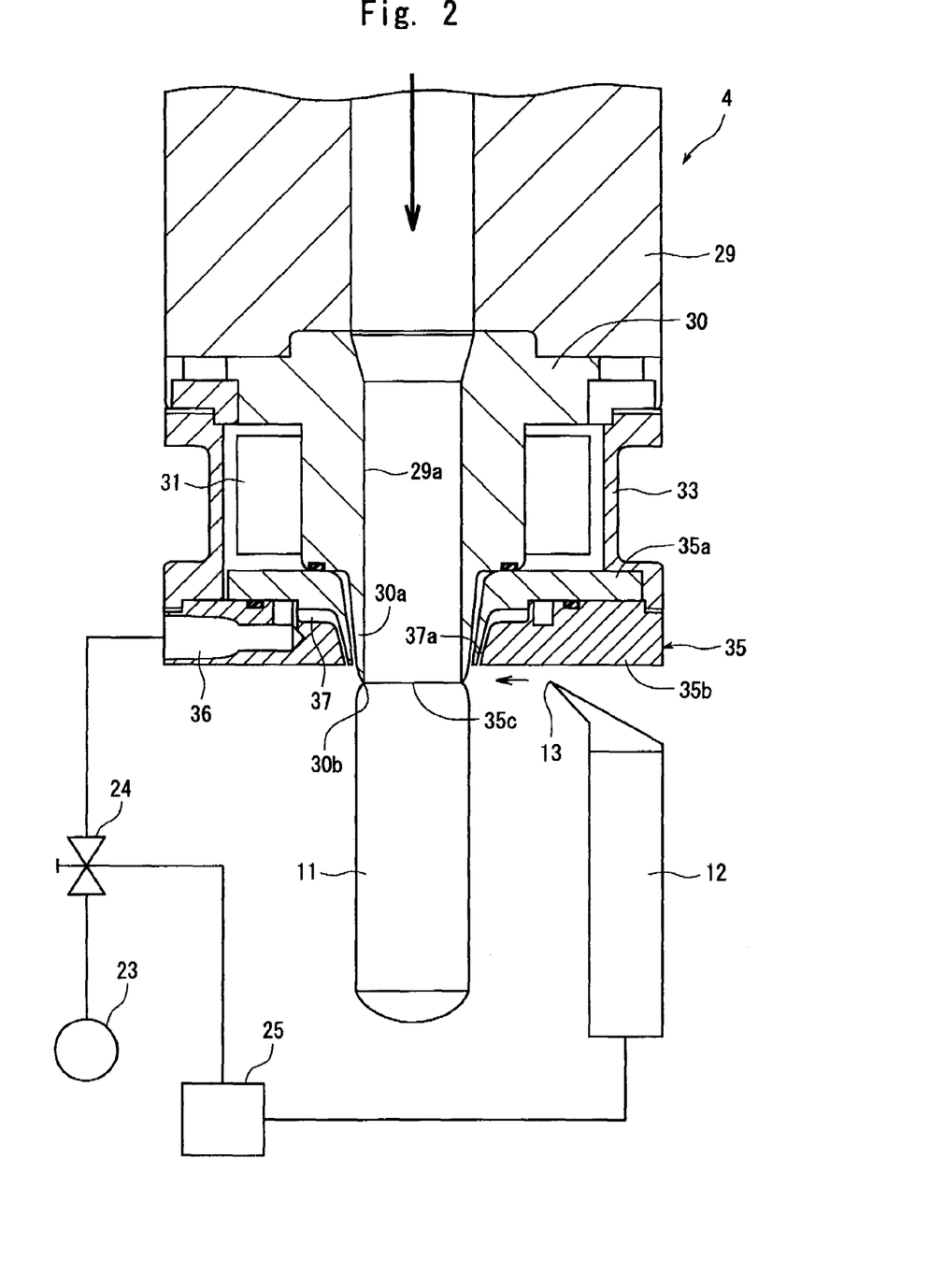
FIG. 2 is a sectional view of an extrusion unit in an extrusion-forming machine using the apparatus for feeding a molten resin of FIG. 1.
Figure 3:
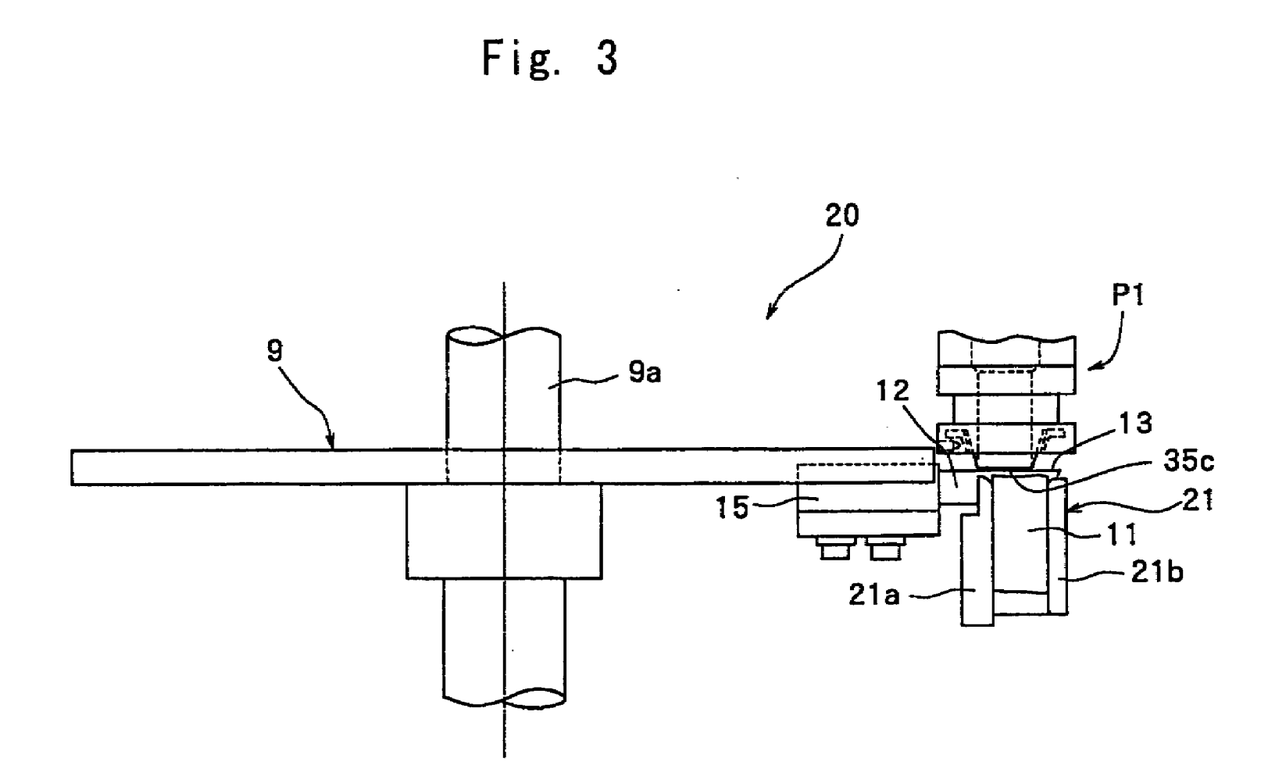
FIG. 3 is a sectional view of a state where a holding member of conveyer means in the apparatus for feeding a molten resin of FIG. 1 is closed.
Figure 4:
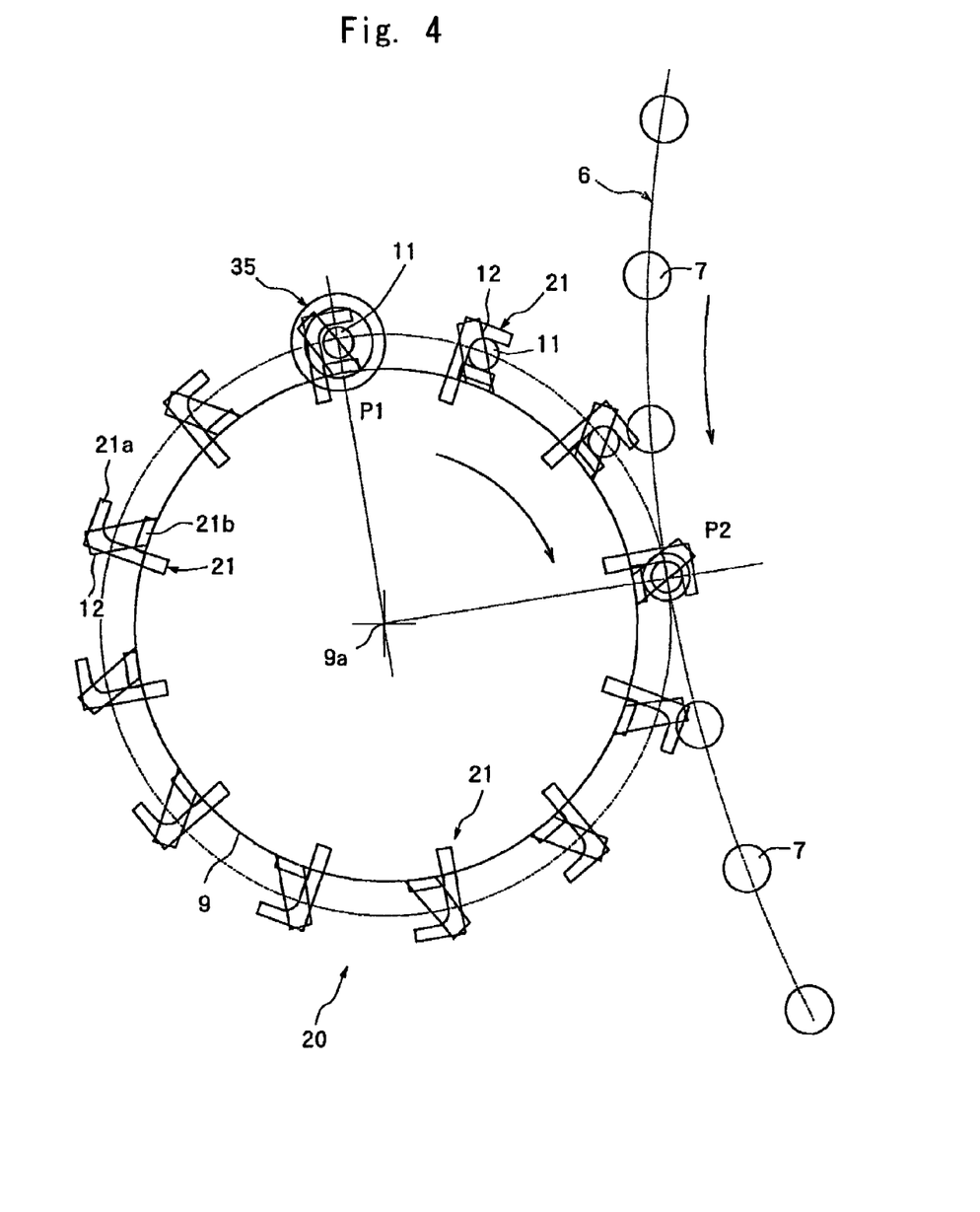
FIG. 4 is a plan view of conveyer means in the apparatus for feeding a molten resin of FIG. 1.
Figure 5:
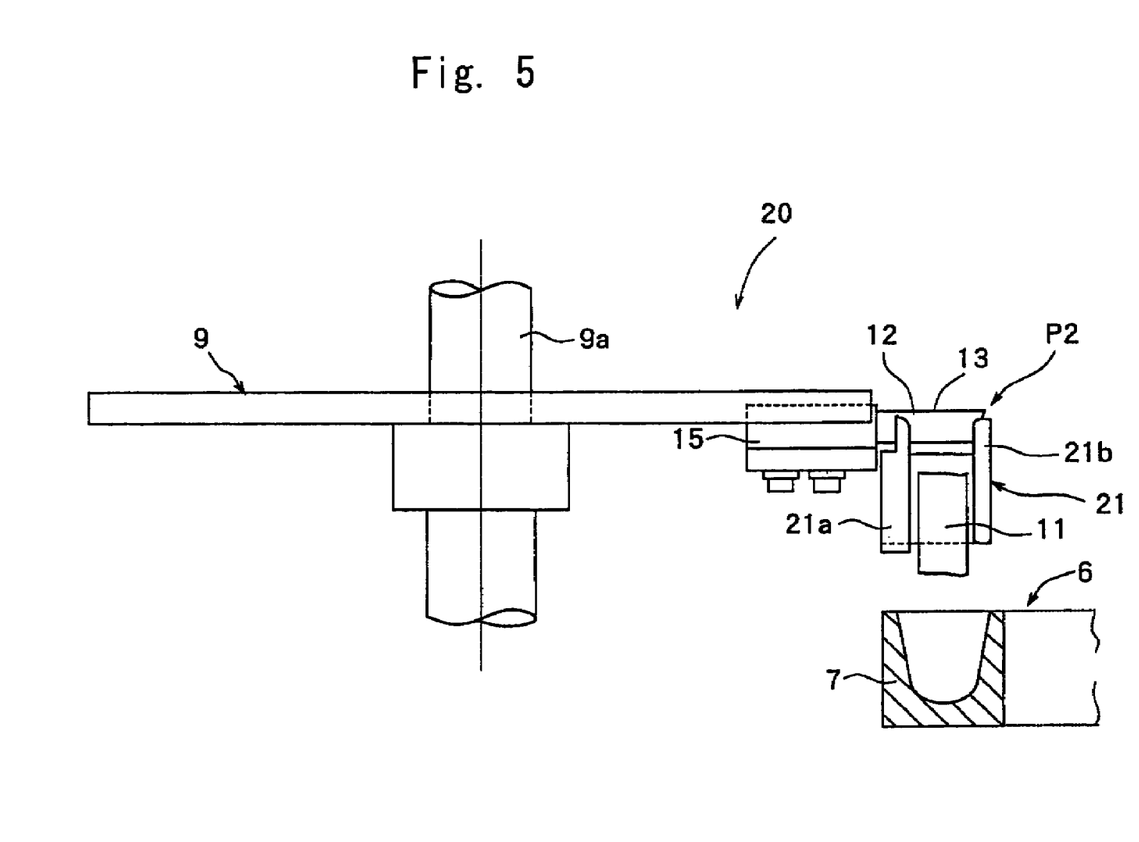
FIG. 5 is a sectional view of a state where the holding member of conveyer means in the apparatus for feeding a molten resin of FIG. 1 is opened.

FIG. 1 is a view of an apparatus 1 for feeding a molten resin and a compression-forming machine 6 according to the present invention, FIG. 2 is a view illustrating, on an enlarged scale, an extrusion unit 4 in an extruder 2 which uses the apparatus for feeding the synthetic resin, FIG. 3 is a sectional view of a position where the molten resin from the extrusion unit 4 is handed over to a conveyer unit 20, FIG. 4 is a plan view of the conveyer unit 20 and a compression-forming machine 6, and FIG. 5 is a sectional view of a position where the molten resin from the conveyer unit 20 is handed over to the compression-forming machine 6.

First, briefly described below is a flow of a molten resin 11 formed by the extruder 2 (see FIG. 2).

The apparatus 1 for feeding the molten resin which is a synthetic resin includes the extruder 2 of a cylindrical shape. The extruder 2 heats, melts and kneads the synthetic resin material such as polyethylene terephthalate (PET), and conveys the molten resin 11 to a gear pump 3. To feed the molten resin 11 maintaining stability, the gear pump 3 blows out the molten resin 11 by the mesh of the gears. The gear pump 3 is connected, through a pipe 2a, to the extrusion unit 4 that is downwardly directed as shown in FIG. 2. The extrusion unit 4 has an extrusion opening 35c formed at a lower end portion thereof. The extrusion opening 35c has a circular shape in cross section, and the molten resin 11 is continuously extruded downward through the extrusion opening 35c being formed in nearly a cylindrical shape.

Referring to FIG. 3, the extruded molten resin 11 (drop) is cut by a cutter 12 and is separated away from the extrusion opening 35c. The molten resin 11 after cut is fed to a molten resin conveyer unit 20 in a transfer mechanism.

The conveyer unit 20 opens and closes a holding unit 21 that holds the molten resin 11 so as to hold the molten resin 11 in its closed state and to downwardly discharge the molten resin 11 which it has held in its opened state. The holding unit 21 is allowed to move about the rotary shaft thereof. The molten resin 11 held by the holding unit 21 which is in the closed state is transferred to a position over a female mold 7 of the compression-forming machine 6. Thereafter, the holding unit 21 is opened, so that the molten resin 11 falls down due to the gravitational action, and is transferred into the female mold 7 shown in FIGS. 4 and 5. A preform from which a container will be obtained is formed by the female mold 7 and a male mold (not shown) of the compression-forming machine 6.

Reference numeral 8 in FIG. 1 denotes a take-out mechanism for taking out the preform after having been formed.

FIG. 2 is a sectional view of the extrusion unit 4 in the extruder on an enlarged scale.

The extrusion unit 4 has an extrusion nozzle 30 attached to the lower portion of a cylindrical member 29. The extrusion unit 4 introduces the molten resin into the interior thereof and is forming a flow hole 29a of a circular shape in transverse cross section with its axis stretching up and down. A heater 31 is arranged surrounding the extrusion nozzle 30 to prevent the molten resin 11 passing through the flow hole 29a from being cooled. The heater 31 is surrounded by a support bracket 33 attached to the lower part of the cylindrical member 29. The support bracket 33 is nearly of a U-shape in its half cross section, i.e., of an annular shape with its open sides of U-shape being directed outward, and is supporting on its lower surface an air injection nozzle 35 that is connected to an air feed means 23 such as a pump (not shown) that feeds the air of normal temperature.

Figure 6:
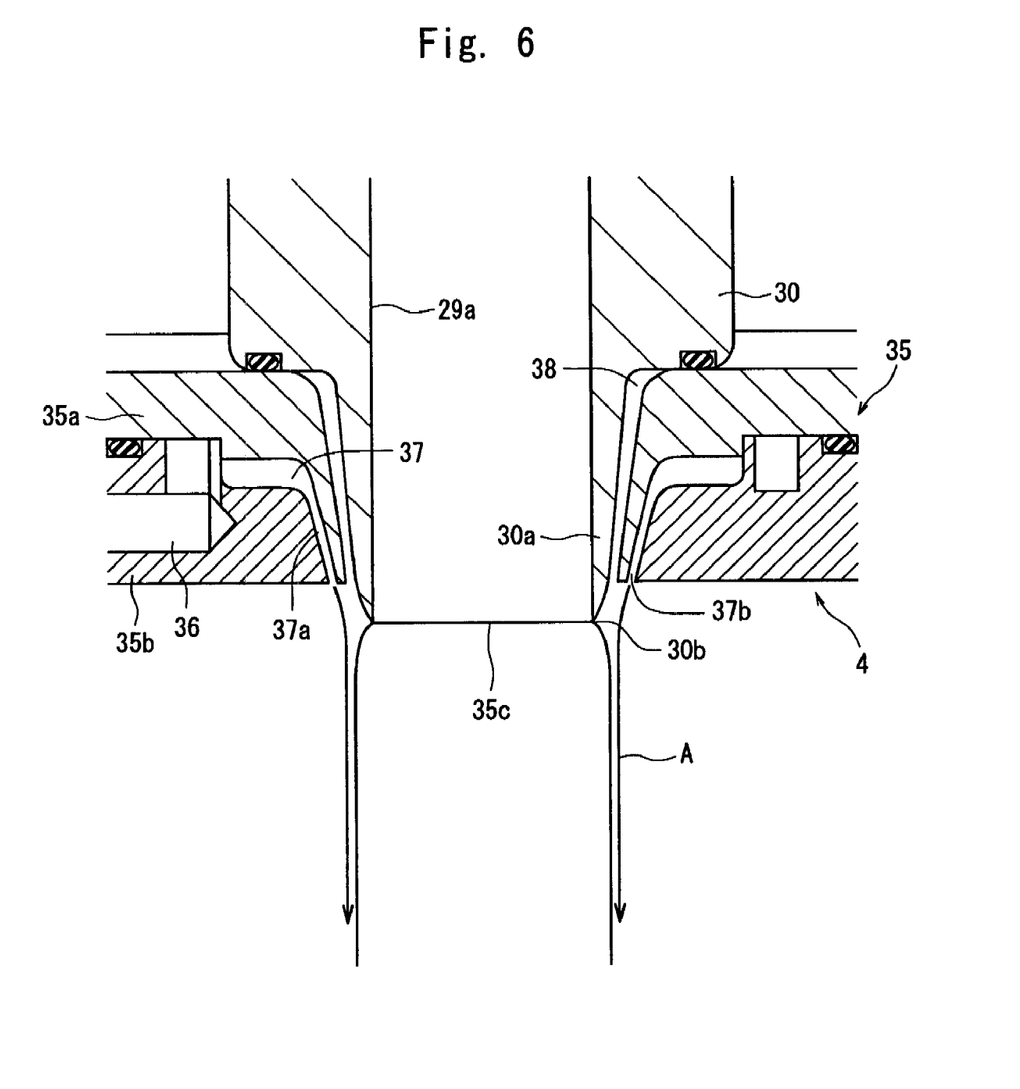
FIG. 6 is a sectional view illustrating, on an enlarged scale, an extrusion nozzle of the extrusion unit in the extrusion-forming machine of FIG. 2.

An end nozzle 30a (FIG. 6 is a view thereof of a further enlarged scale) is formed at the lower side of the position where the extrusion nozzle 30 is corresponded to the heater 31, and an end edge 30b at the lower end of the end nozzle 30a is formed at an acute angle like the edge of a knife. As required, a micro-heater may be wound around this portion or a heater may be buried in this portion by casting.

The air injection nozzle 35 is constituted by an annular upper plate 35a and an annular lower plate 35b arranged up and down, and is forming an air feed port 36 in an end portion thereof being connected to the air feed means 23. The air feed port 36 is forming an annular passage 37 surrounding the extrusion nozzle 30. Referring to FIG. 6, the annular passage 37 extends aslant and downward on the inside in the radial direction of the annular air injection nozzle 35, and is communicated with an air injection passage 37a formed between the upper plate 35a and the lower plate 35b. An annular air injection port 37b is formed at the lower end of the air injection passage 37a. The air injection port 37b is positioned higher than the position of the end edge 30b of the extrusion nozzle 30. In other words, the end edge 30b of the extrusion nozzle 30 is arranged protruding downward beyond the air injection port 37b.

The aslant angle of the air injection passage 37a must be such that the air injection passage 37a is directed to a position lower than the end edge 30b of the extrusion nozzle 30, so that the air injected from the air injection nozzle 35 is not blown to the end edge 30b but that the air is blown to the whole circumferential surface of the holding unit 21 which holds the molten resin and to which the molten resin 11 comes in contact. An annular gap 38 is formed between the end nozzle 30a of the extrusion nozzle 30 and the inner circumferential surface of the air injection nozzle 35.

Referring to FIG. 1, the extrusion unit 4 of the extruder 2 is so constituted as to move between the acting position (imaginary line) vertically over the locus of rotation of the holding unit 21 of the conveyer unit 20 and then on-acting position (solid line) retreated in a horizontal direction from the locus of rotation being driven by a drive source that is not shown.

Referring to FIGS. 3 to 5, the conveyer unit 20 of the apparatus 1 for feeding the molten resin has a turntable 9. The turntable 9 is supported by a rotary shaft 9a having a vertical axis and is rotated clockwise in FIG. 4 by a drive source (not shown) such as an electric motor. The conveyer unit 20 is so conveyed as to pass through a position P1 opposed to the extrusion nozzle 30 to receive the molten resin 11, and a discharge position P2 opposed to the female mold 7 of the compression-forming machine 6. The conveyer unit 20 is equipped with the cutter 12 for cutting the molten resin and the holding unit 21 for holding the molten resin.

The cutter 12 is attached to a mounting portion 15 on the lower surface side of the turntable 9 of the conveyer unit 20. In a state where the cutter 12 is attached to the turntable 9, the blade tip 13 of the cutter 12 is so positioned as to horizontally protrude outward in the radial direction of the turn table 9 beyond the circumferential edge of the turntable 9.

Therefore, as the molten resin 11 is extruded from the extrusion opening 35c of the extrusion nozzle 30 and as the turntable 9 is rotated, the blade tip 13 of the cutter 12 horizontally traverses just under the extrusion opening 35c maintaining a predetermined gap to thereby cut the molten resin 11 that is extruded vertically downward from the extrusion opening 35c.

Referring to FIG. 2, a shut-off valve 24 is provided between the air feed means 23 and the air feed port 36, and is opened and closed being controlled by a control unit 25. Upon detecting the rotational angle of the cutter 12, the control unit 25 opens the shut-off valve 24 a predetermined rotational angle before the blade tip 13 of the cutter 12 cuts the molten resin 11 to inject the air onto the surface of the molten resin 11. The opening/closing degree of the shut-off valve 24, opening/closing time thereof and the timing for opening the shut-off valve 24 can be arbitrarily adjusted by the control unit 25.

The holding unit 21 includes a first holding member 21a and a second holding member 21b. The holding members 21a and 21b are so constituted as to be opened and closed; i.e., the holding members 21a and 21b are closed at the position P1 opposed to the extrusion nozzle 30 for receiving the molten resin. FIG. 3 shows the holding members 21a and 21b in a state of holding the molten resin 11. At the position P2 for discharging the molten resin shown in FIG. 5, the holding members 21a and 21b are opened permitting the molten resin 11 to fall down onto the female mold 7.

The compression-forming machine 6 is equipped with a rotary support member 6a and the forming molds inclusive of a plurality of female molds 7 arranged on the rotary support member 6a, and rotates counterclockwise as shown in FIG. 4.

Operation of this embodiment will be described below.

In feeding the molten resin 11 in the forming operation, first, the extrusion unit 4 of the extruder 2 shown in FIG. 1 is brought to the receiving position P1 shown in FIGS. 3 and 4. Due to the operation of the gear pump 3, the molten resin 11 is continuously extruded from the extrusion opening 35c. When the state of feeding the molten resin becomes stable, the molten resin 11 is fed onto the conveyer means.

Referring to FIG. 2, as the molten resin 11 is extruded from the extrusion opening 35c and the cutter 12 comes to a predetermined position, the control unit 25 instructs the shut-off valve 24 so as to be opened; i.e., the shut-off valve 24 is opened. Therefore, the air is fed with pressure from the air feed means 23 to the air feed port 36, passes through the annular passage 37, and is fed to the air injection passage 37a and to the air injection port 37b. The air is injected from the air injection port 37b onto the surface of the molten resin for a predetermined period of time; i.e., the air is blown onto the outer circumferential surface of the molten resin 11 as indicated by arrows A in FIG. 6. The injected air blows off volatile components generated from the molten resin 11 so will not to deposit on the units which follow the cutting tool and, particularly, so will not to deposit on the surfaces of the holding members 21a, 21b of the holding unit 21.

Adverse effect caused by the injection of the air is overcome in a manner as described below. The air injection passage 37a is directed to a position lower than the end edge 30 band, therefore, the end edge 30b is not cooled with the injected air. The injected air cools the surface only of the molten resin 11. Since the end edge 30b is not cooled, impurities do not deposit on the end edge 30b. The end edge 30b of the end nozzle 30b is so formed as to become thin toward the end, so that impurities are further prevented from depositing on the end edge 30b.

In the extrusion unit 4, the air injection nozzle 35 is arranged surrounding the end nozzle 30a of the extrusion nozzle 30 forming a gap 38 between the end nozzle 30a and the air injection nozzle 35. The air in the gap works as a heat-insulating material, and the end nozzle 30a is prevented from being cooled by the flow of the air. The air injected from the air injection nozzle 35 similarly works to prevent or suppress the rise of temperature caused by the heat of the molten resin 11. Thus, the adverse effect is prevented which otherwise is caused by the injection of the air onto the molten resin 11 extruded from the extrusion nozzle 30.

As the cutter 12 cuts the molten resin 11 accompanying the rotation of the conveyer unit 20, the holding members 21a and 21b of the holding unit 21 hold the molten resin 11 (see FIG. 3). The turntable 9 of the conveyer unit 20 rotates in synchronism with the rotary support member 6a of the compression-forming machine 6, which are driven by separate drive sources.

Referring to FIG. 4 or 5, the turntable 9 and the rotary support member 6a rotate in the directions opposite to each other, which, therefore, become the same at a contact point on the loci of rotation of the two. Therefore, a relatively static state is established at the exhaust position P2 at where the loci of rotation come in contact as the holding members 21a, 21b and the female mold 7 moves in synchronism. When the molten resin 11 is brought to just over the female mold 7, therefore, the holding state by the holding members 21a, 21b is released so that the molten resin 11 falls down so as to be fed into the female mold 7. At this moment, a thin cooled film has been formed on the surface of the molten resin 11 having a temperature lower than the temperature on the inside thereof. Therefore, the molten resin 11 acquires a decreased viscosity, exhibits a decreased coefficient of friction to the surfaces of the holding members 21a, 21b, and is smoothly fed into the female mold 7.

As described above, matters such as oligomer and high molecular PET deposit less on the holding members 21a, 21b. Therefore, even when the apparatus 1 is continuously operated for feeding the molten resin, a delay in the timing for falling the molten resin 11 onto the female mold 7 by releasing the holding members 21a, 21b can be decreased. A decrease in the amount of deposits makes it possible to feed the molten resin 11 into the female molds 7 for extended periods of time maintaining stability, to continuously produce the preforms, to decrease the frequency for cleaning the holding units 21 and to improve the operation efficiency of the apparatus 1 for feeding the molten resin.

In the compression-forming machine 6 shown in FIG. 1, as the female mold 7 that has received the molten resin 11 arrives at a predetermined position accompanying the rotation of the rotary support member 6a, a male mold (not shown) disposed vertically over the female mold 7 starts descending to commence the compression forming which is completed at a predetermined position on the downstream side. Thus, the operation of the apparatus 1 is repeated for feeding the molten resin.

Example

The apparatus for feeding the molten resin was operated under the following conditions in accordance with the present invention to measure the temperature on the surface of the molten resin and the number of times of feeding the molten resin.

Material: PET
    Amount of extrusion: 300 kg/hour
    Diameter of resin extrusion opening: 20 mm
    Gap of air injection portion: 0.6 mm
    Diameter of air blow portion: 23 mm
    Air feed pressure: 0.1 MPa
    Amount of extruding the molten resin (drop): 25 g The molten resin extruded from the extrusion opening of the extruder was measured for its temperature on the surface thereof by using a radiation thermometer to be in a range of 250° C. to 240° C.

The apparatus for feeding the molten resin was cleaned and was continuously operated to measure the number of times of consecutive feeding per a set of the cutter 12 and the holding means 21 until the next cleaning became necessary. The molten resin (drop) could be consecutively fed up to about 10,000 to about 15,000 times.

Comparative Example

The material, amount of extrusion, diameter of the resin extrusion opening and the amount of extruding the molten resin were the same as those of the above Example. The molten resin was measured for its temperature on the surface thereof without blowing the air onto the surface of the molten resin, and the number of times of consecutively feeding the molten resin was measured in the same manner as in the above Example.

The temperature on the surface of the molten resin was measured by using a radiation thermometer to be in a range of 288° C. to 282° C.

Further, the number of times of consecutively feeding the molten resin from the apparatus for feeding the molten resin was measured to be about 2,000 to about 3,000 times before the cleaning of the next time was necessary.

As compared to the Comparative Example, the Example of the present invention lowered the surface temperature of the molten resin by about 42° C. to about 38° C. and made it possible to increase the number of times of consecutively feeding the molten resin by about five folds.

Though an embodiment of the invention was described above, it should be noted that the invention can be varied or modified in a variety of other ways without departing from the technical scope of the invention, as a matter of course.

In the above embodiment, for example, the gap 38 which is an annular space is formed as a heat-insulating member between the end nozzle 30a of the extrusion nozzle 30 and the inner peripheral surface of the air injection nozzle 35. A solid material having heat-insulating property may be arranged as a heat-insulating material to substitute for the air in the gap 38. The invention may be further applied to a feeding apparatus which continuously rotates but which is not of a circular motion of a constant radius to continuously inject the air during the operation.

The above embodiment has used the air as the cooling fluid. As the cooling fluid, however, there can be also used, in addition to the air, an inert gas, the compressed air or the inert gas containing a liquid vapor.

According to the method of feeding the molten resin of the invention, the molten resin is extruded from an extrusion opening of an extrusion nozzle, and the molten resin is cut with a cutting tool while injecting, or after having injected, the cooling fluid onto the surface portion of the molten resin maintaining a predetermined gap from the extrusion opening in a direction in which the molten resin is extruded. Therefore, the oligomer component and the high molecular PET on the surface of the molten resin are blown off with the fluid, or the surface of the molten resin is cooled to suppress the generation of the oligomer component and the high molecular PET. The oligomer component and the high molecular PET deposit or are transferred little onto the tools used in the steps after the step of using the cutting tool for cutting the molten resin. Therefore, the molten resin that is cut can be held and conveyed up to the female mold of the compression-forming metal mold. When the molten resin just over the female mold is going to fall down into the female mold, no component has been deposited that impairs the slipping of the molten resin mass while the molten resin is being conveyed, and slipping property is maintained. As a result, the time for continuous operation can be lengthened for smoothly falling the molten resin from the holding member, and the operation efficiency of the apparatus can be increased.

The apparatus for feeding a molten resin of the present invention comprises an extrusion nozzle for discharging the molten resin from an extrusion opening; a cutting tool for cutting the molten resin discharged from the extrusion opening of the extrusion nozzle; a holding member equipped with a mechanism for holding and releasing the molten resin discharged from the extrusion opening; and conveyer means for supporting the cutting tool and the holding member, and for conveying the holding member holding the molten resin after having been cut up to a female mold of a compression-forming metal mold; wherein the holding member releases the molten resin at a position over the female mold so as to be fed into the female mold; the apparatus for feeding a molten resin further comprising injection means for injecting a fluid to the surrounding of the extrusion nozzle, wherein an injection port of the injection means is directed to the surface of the molten resin maintaining a predetermined gap from the extrusion opening of the extrusion nozzle in a direction of extrusion of the extrusion nozzle, and the molten resin of which the surface is cooled with the fluid is held by the holding member.

By forming a thin cooled film on the surface of the molten resin having a temperature different from the temperature in the interior thereof, matters deposit little on the members for holding the molten resin in the conveyer means. Since matters deposit little on the conveyer means, the molten resin can be smoothly fed for extended periods of time when it is going to be fallen down into the female mold of the compression-forming machine. As a result, the operation efficiency of the apparatus for feeding the molten resin can be improved.

In the apparatus for feeding the molten resin, the injection means is provided in an annular shape to surround the extrusion nozzle, and a gap for insulating the heat is formed in an annular shape between the fluid feeding means and the extrusion nozzle. Therefore, the fluid from the injection means little receives the heat of the molten resin. Besides, the end of the extrusion nozzle is not very cooled by the fluid and, therefore, the molten resin can be blown maintaining stability, the volatile components on the surface of the molten resin after extruded are blown off and, besides, the surface of the extruded resin can be cooled.

Further, the above apparatus feeds the molten resin which is the polyester molten resin that easily deposits on the holding members. Here, the present invention works to effectively decrease the deposition of matters on the holding portions.

The invention claimed is:

1. A method of feeding a molten resin, the method comprising:
    extruding the molten resin downward from an extrusion opening of an extrusion nozzle, cutting the molten resin with a cutting tool after having injected, or while injecting, a cooling fluid from an injection port onto the surface portion of the molten resin, holding the molten resin after having been cut so as to be conveyed up to a female mold of a compression-forming metal mold, and causing the molten resin at a position just over said female mold to fall down into said female mold, wherein a predetermined gap is present between the injection port and the extrusion opening.

2. An apparatus for feeding a molten resin comprising:

an extrusion nozzle for discharging downward the molten resin from an extrusion opening;

a cutting tool for cutting the molten resin discharged from the extrusion opening of said extrusion nozzle;

a holding member equipped with a mechanism for holding and releasing the molten resin discharged from said extrusion opening; and a conveyer means for supporting the cutting tool and said holding member, and for conveying said holding member holding the molten resin after having been cut up to a female mold of a compression-forming metal mold; wherein said holding member releases the molten resin at a position over said female mold so as to be fed into said female mold;

said apparatus for feeding a molten resin further comprising an injection port adjacent said extrusion opening for injecting a cooling fluid to a surface portion of the molten resin discharged, wherein a predetermined gap is present between the injection port and the extrusion opening.

3. The apparatus for feeding a molten resin according to claim 2, wherein said injection port is provided in an annular shape to surround said extrusion nozzle, and said gap is formed in an annular shape between said injection port and said extrusion opening, said gap providing a heat insulating property.

4. The apparatus for feeding a molten resin according to claim 2, wherein said molten resin is a molten resin of a polyester.

* * * * *